United States Patent [19]

Enami

[11] Patent Number: 5,315,242

[45] Date of Patent: May 24, 1994

[54] METHOD FOR MEASURING AC SPECIFICATIONS OF MICROPROCESSOR

[75] Inventor: Tomokazu Enami, Tokyo, Japan

[73] Assignee: NEC Corporation, Tokyo, Japan

[21] Appl. No.: 884,128

[22] Filed: May 18, 1992

[30] Foreign Application Priority Data

May 16, 1991 [JP] Japan .................................. 3-111367

[51] Int. Cl.$^5$ ...................... G01R 31/02; G01R 31/28
[52] U.S. Cl. .................. 324/158 R; 324/73.1; 371/15.1; 371/22.1
[58] Field of Search ........... 324/158 R, 158 T, 158 D, 324/73.1; 371/16.2, 22.1, 22.5, 16, 25.1, 15.1

[56] References Cited

U.S. PATENT DOCUMENTS

| | | | |
|---|---|---|---|
| 4,354,268 | 10/1982 | Michel et al. | 371/22.1 |
| 4,497,056 | 1/1985 | Sugamori | 371/25.1 |
| 4,674,089 | 6/1987 | Poret et al. | 371/25.1 |
| 4,785,416 | 11/1988 | Stringer | 371/16.2 |
| 4,918,385 | 4/1990 | Shreeve | 324/158 R |
| 4,949,033 | 8/1990 | Kono et al. | 324/158 R |
| 4,970,454 | 11/1990 | Stambaugh et al. | 324/158 T |
| 5,039,939 | 8/1991 | Dick et al. | 324/158 R |
| 5,095,267 | 3/1992 | Merrill et al. | 371/22.5 |

FOREIGN PATENT DOCUMENTS 0058352  2/1990  Japan .................. 371/22.5

OTHER PUBLICATIONS

μPD70208 (Document Number: IC-7078B (third edition), published in May, 1989).

Primary Examiner—Vinh Nguyen
Attorney, Agent, or Firm—Sughrue, Mion, Zinn, Macpeak & Seas

[57] ABSTRACT

In measuring the ac specifications of a microprocessor having within one chip, a clock generator which generates a clock signal, a first connecting terminal for connecting a crystal oscillator which regulates the oscillation frequency of the clock generator, a first driver which amplifies the power of the clock signal, a second connecting terminal which receives an output of the first driver, a peripheral circuit which receives the supply of a clock signal, a CPU which is operated by the clock signal and controls the operation of the peripheral circuit, a second driver which amplifies the power of an output of the CPU, and a third connecting terminal which receives the supply of an output of the second driver, there are executed a first step of measuring the ac specification of the clock generator with the output to the second connecting terminal by applying test pulses from an IC tester to the first connecting terminal under the condition in which the crystal oscillator is removed, and a second step of measuring the ac specification of the CPU with the output to the third connecting terminal by removing a connecting line and applying test pulses from the IC tester to a fourth connecting terminal.

2 Claims, 1 Drawing Sheet

METHOD FOR MEASURING AC SPECIFICATIONS OF MICROPROCESSOR

BACKGROUND OF THE INVENTION

1. Field of the Invention

The present invention relates to a method for measuring the ac specifications of a microprocessor having a clock generator.

2. Description of the Prior Art

Generally, a square wave having a predetermined frequency is adopted as a clock signal used in a digital system for such reasons as that the states of various kinds of signals are binary and that it is convenient in the process of successively generating different signals from one signal. Due to the fact that almost all of the microprocessors that have been put to practical use in recent years are of von Neumann type, such a clock signal is used not only as an operating reference signal for the microprocessor itself, but also as a synchronizing reference signal that is required in inputting or outputting an internal signal of the microprocessor or as a reference signal for synchronizing an input or output signal between an external circuit and the microprocessor. An example of such a microprocessor is found in the 16/8-bit microprocessor μPD70208 (Document Number IC-7078B (third edition), published in May, 1989) made by NEC Corp.

In a prior art microprocessor, a CPU which carries out signal processing, a clock generator and a peripheral circuit located in the periphery of the CPU, such as an auxiliary memory circuit or a signal input/output control circuit intended to enhance the operating speed of the microprocessor, are assembled on the identical chip. A crystal oscillator from outside of the chip is connected to the connection terminals that are joined to the clock generator. The CPU and the peripheral circuit are connected on the identical chip by signal lines for mutually transferring data, address signals and various kinds of signals. The clock generator is connected to a driver within the chip for amplifying an input signal to each control circuit unit within the chip, via a first driver that amplifies a clock signal from a clock oscillator to output it to a control circuit unit, and the output end of the first driver is connected within the chip to a first connecting terminal via a second driver. The output end of the driver within the chip is connected within the chip to the CPU and the peripheral circuit, and the output end of the CPU is connected to a second connecting terminal within the chip via a third driver. The first connecting terminal and the second connecting terminal are respectively connected to an external circuit in the outside of the chip. Accordingly, a clock signal generated in the clock generator is supplied almost simultaneously to the CPU, the peripheral circuit and the external circuit. Each of the CPU, the peripheral circuit and the external circuit executes the internal processing while synchronizing with the clock signal, and the signal generated as a result of this processing is output also synchronizing with the clock signal.

In order to evaluate the performance of the microprocessor its ac specifications are measured. What is meant by the ac specifications are the temporal specifications between the transition points (ac states) of the input/output signals. The contents of the specifications can be classified into the following items.

1. The cycle time of the clock signal
2. The time width of a high level or a low level of the signal
3. The rise time/fall time of the signal
4. The delay time (the time from "completion of transition of a first signal" to the corresponding "completion of transition of a second signal")
5. The setup time (The setup time margin for sampling a first signal with a second signal. It specifies the time from "completion of transition of the first signal" to "starting of transition of the second signal")
6. The hold time (The hold time margin for latching or sampling a first signal with a second signal. It specifies the time from "completion of transition of the second signal" to "starting of transition of the first signal")
7. The float delay time (The delay time in which, for a transition of a first signal, a second signal (output) goes to a floating (high impedance) state. It specifies the time from "completion of transition of the first signal" to "starting of transition of the second signal")
8. The timing chart of the ac specifications (arranging into a chart of the above-mentioned items)
9. The measuring points of the various input/output signals in the ac specification timing chart (for example, the measuring points for a maximum level of 2.4 V and a minimum level of 0.45 V are 2.2 V and 0.8 V, respectively)

The above-mentioned items define the temporal specifications between the transition points of the input/output signals. Considering the fact that these input/output signals are synchronized with the clock signal, it is mandatory that the clock signal and the above-mentioned ac specifications keep a close relationship.

The prior art microprocessor described above includes the following problems.

In taking measurement of the above-mentioned ac specification, the crystal oscillator is disconnected from the connecting terminals to input a clock signal from an IC tester to the connecting terminals, and the ac specification is measured using the first and the second connecting terminals. However, the ac specification measured in this manner does not correspond to the ac specification from the first connecting terminal to the second connecting terminal. Therefore, the reference signals of the ac specifications for the CPU within the chip and the external circuit in the outside of the chip adopted in defining the ac specifications, among the specified electrical properties, of the microprocessor, are not set to be equal.

In order to measure the ac specifications of a chip having a clock output terminal as in this example it becomes necessary to further measure the specification from the clock oscillator that constitutes the clock generator to the first connecting terminal, requiring a large amount of work.

In defining an ac specification of the microprocessor, after measuring the temporal specification of the second connecting terminal with respect to a clock signal to the connecting terminal by using an IC tester, the temporal specification of a clock signal to the second connecting terminal with respect to a clock signal to the first connecting terminal is defined by further measuring the delay time of the clock signal in the first connecting terminal with respect to the input clock signal. As in the above, the measurement of the AC specifications of the microprocessor according to the conventional technology not only generates troubles but also increases the measurement errors.

BRIEF SUMMARY OF THE INVENTION

Objects of the Invention

It is a first object of the present invention to provide a method for measuring the ac specifications of a microprocessor which can carry out the measurement of the ac specifications according to a simplified procedure.

It is a second object of the present invention to provide a method for measuring the ac specifications of a microprocessor which can reduce the measurement errors in the ac specification measurement.

SUMMARY OF THE INVENTION

A microprocessor which becomes the object of the ac specification measurement includes within one chip a clock generator which generates a clock signal, a first connection terminal for connecting a crystal oscillator which regulates the frequency of the clock generator, a first driver which amplifies the power of the clock signal, a second connection terminal which receives the supply of the output of the first driver, a peripheral circuit which is operated by the supply of the clock signal, a CPU operated by the clock signal and controls the operation of the peripheral circuit, a second driver for amplifying the power of the signal processed by the CPU, and a third connecting terminal to which is supplied the output of the second driver.

In measuring the ac specification of the clock generator, in the ac specification measuring mode of the microprocessor, the ac specification is measured by the signal from the second connecting terminal obtained by applying test pulses from an IC tester to the first connecting terminal in the condition where the crystal oscillator is disconnected.

In measuring the ac specification of the CPU, the ac specification is measured by the signal from the third connecting terminal obtained by applying test pulses of the IC tester to a fourth connecting terminal.

BRIEF DESCRIPTION OF THE DRAWINGS

The above-mentioned and other objects, features and advantages of this invention will become more apparent by reference to the following detailed description of the invention taken in conjunction with the accompanying drawings.

DETAILED DESCRIPTION OF THE PREFERRED EMBODIMENTS

Figure 1:
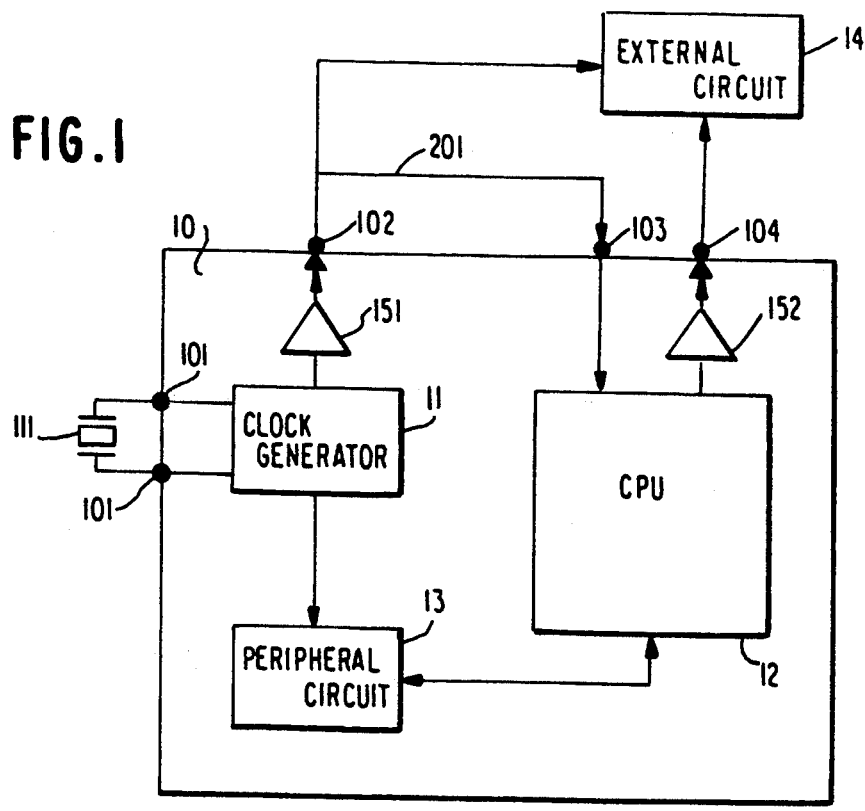
FIG. 1 is a block diagram showing a first embodiment of the invention.

Referring to FIG. 1, a first embodiment of the invention will be described.

A clock generator 11, a CPU 12 and a peripheral circuit 13 are provided within a chip 10 similar to the prior art, and a crystal oscillator 111 from the outside is connected to connecting terminals 101 that are connected to the clock generator 11. The output end of the clock generator 11 is connected to a connecting terminal 102 via a driver 151, and the connecting terminal 102 is connected to a connecting terminal 103 by a connecting line 201. The connecting terminal 103 is connected to the input end of the CPU 12, and the output end of the CPU 12 is connected to a connecting terminal 104 via a driver 152. The connecting terminal 102 and the connecting terminal 104 are connected to an external circuit 14.

A processed output signal of the CPU 12 is output to the external circuit 14 from the connecting terminal 104 via the driver 152 synchronized with a clock signal input from the connecting terminal 103. The driver 151 will be sufficient if it has a necessary minimum power amplification factor. The measurement for the evaluation of the ac specification becomes possible by simply inputting the clock signal of an IC tester to the connecting terminal 103. Moreover, if only the clock oscillator 112 part included in the clock generator 11 needs be evaluated, it suffices to input a clock signal of the IC tester to the connecting terminal 101 by removing the crystal oscillator 111. Accordingly, the measurements for the evaluation of the ac specifications can be facilitated.

Figure 2:
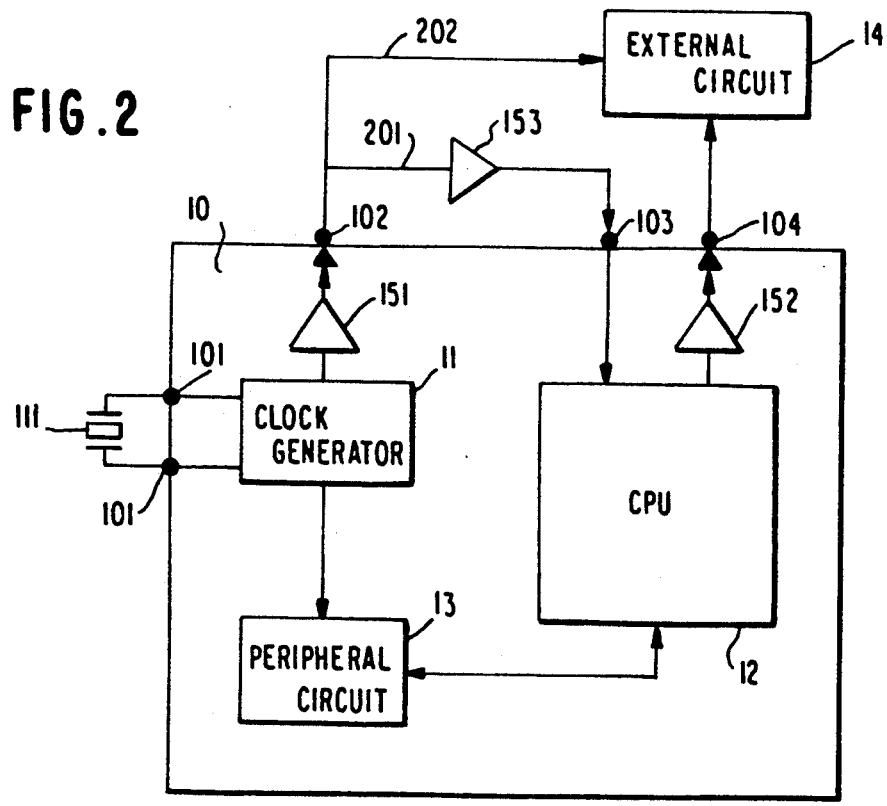
FIG. 2 is a block diagram showing a second embodiment of the invention.

Next, referring to FIG. 2, the second embodiment of the invention will be described.

This embodiment has the identical constitution as that of the embodiment shown in FIG. 1 except that the connecting line 201 from the connecting terminal 102 is connected to the connecting terminal 103 via a driver 153, and that a connecting line 202 from the connecting terminal 102 is connected to the external circuit 14.

With this embodiment, a measurement similar to the case of the embodiment in FIG. 1 can be made by inputting a clock signal of the IC tester to the connecting terminal 103 and measuring the connecting terminal 104.

The outputs to the external circuit 14 are only a clock signal from the connecting line 202 and a processed signal from the connecting terminal 104. As the driver 153 one needs to select a driver which has an appropriate driving capability depending upon the fanout number of the connecting terminal 102 determined when constructing the driver on a system board. However, differing from the case according to the prior art, the input clock signal to the CPU 12 and the input clock signal to other ICs in incorporating this microprocessor into a system are the same. Therefore, the relation between these input clock signals does not depend on the capability of the driver 153.

Although the invention has been described with reference to specific embodiments, this description is not meant to be construed in a limiting sense. Various modifications of the disclosed embodiments, as well as other embodiments of the invention, will become apparent to persons skilled in the upon reference to the description of the invention. It is therefore contemplated that the appended claims will cover any modifications are embodiments as fall within the true scope of the invention.

What is claimed is:

1. A method for measuring ac characteristics of a microprocessor which has, on a single semiconductor chip, a first terminal, a clock generator coupled to said first terminal, a second terminal, a first driver connected between said clock generator and said second terminal, a peripheral circuit coupled to said clock generator, a CPU, a third terminal coupled to said CPU, a fourth terminal, and a second driver connected between said CPU and said fourth terminal, said clock generator cooperating with a crystal oscillator, which is provided outside said semiconductor chip and connected to said first terminal, to generate a clock signal, said clock signal being supplied to said peripheral circuit and further to said CPU through said first driver, said second terminal, and an interconnection wiring which is provided outside said semiconductor chip between said second and third terminals, said CPU responding to said clock signal to control said peripheral circuit and to output a processed signal to said fourth terminal through said second driver, said method comprising the steps of:

applying a train of first test pulses to said first terminal in place of connecting said crystal oscillator to said first terminal to thereby cause said clock generator to output a train of pulses in response to said first test pulses at said second terminal;

measuring said train of pulses appearing at said second terminal to obtain ac characteristics of said clock generator;

applying a train of second test pulses to said third terminal in place of providing said interconnection wiring between said second and third terminals to thereby cause said CPU to output a processed signal to said fourth terminal in response to said second test pulses; and measuring the processed signal appearing at said fourth terminal to obtain ac characteristics of said CPU.

2. The method as claimed in claim 1, said interconnection wiring includes a third driver connected in series therewith.

* * * * *